United States Patent
Nordquist

(10) Patent No.: US 7,404,056 B1
(45) Date of Patent: Jul. 22, 2008

(54) VIRTUAL COPYING SCHEME FOR CREATING MULTIPLE VERSIONS OF STATE INFORMATION

(75) Inventor: Bryon S. Nordquist, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 190 days.

(21) Appl. No.: 11/296,893

(22) Filed: Dec. 7, 2005

(51) Int. Cl.
*G06F 12/00* (2006.01)
(52) U.S. Cl. ...................... 711/166; 711/162
(58) Field of Classification Search .................. 711/161, 711/162, 165, 166
See application file for complete search history.

(56) References Cited

U.S. PATENT DOCUMENTS 6,897,871 B1    5/2005   Morein

*Primary Examiner*—Hiep T Nguyen
(74) *Attorney, Agent, or Firm*—Townsend and Townsend and Crew, LLP

(57) ABSTRACT

State information in a processor is managed using a lookup table that has multiple memory circuits, each with multiple entries. Items of state information belonging to a current state version are stored in a first group of entries in the memory circuits. To create an updated state version, a virtual copy of each of the items of state information is created in a second group of entries in the memory circuits, and the virtual copy of the item being updated is replaced with a real copy of the item from the first group of entries. The item in the first group of entries is then updated.

20 Claims, 11 Drawing Sheets

US 7,404,056 B1

VIRTUAL COPYING SCHEME FOR CREATING MULTIPLE VERSIONS OF STATE INFORMATION

CROSS-REFERENCES TO RELATED APPLICATIONS

The present disclosure is related to the following commonly-assigned co-pending U.S. patent application Ser. Nos. 11/297,189, filed of even date herewith, entitled "Configurable State Table for Managing Multiple Versions of State Information"; and No. 11/296,894, filed of even date herewith, entitled "Parallel Copying Scheme for Creating Multiple Versions of State Information." The respective disclosures of these applications are incorporated herein by reference for all purposes.

BACKGROUND OF THE INVENTION

The present invention relates in general to management of state information in a processor, and in particular to management of multiple versions of state information.

Parallel processing techniques enhance throughput of a processor or multiprocessor system when multiple independent computations need to be performed. A computation can be divided into tasks that are defined by programs, with each task being performed as a separate thread. (As used herein, a "thread" refers generally to an instance of execution of a particular program using particular input data, and a "program" refers generally to a sequence of executable instructions that produces result data from input data.) Parallel threads are executed simultaneously using different processing engines inside the processor.

As is generally known, many programs also rely on "state information" to control or determine various aspects of their behavior. State information typically includes various parameters that are supplied to the program at execution time, allowing the parameters to be readily modified from one instance to the next of program execution. For example, in the context of computer-based image rendering, shader programs are well known. Many shader programs include instructions for applying one or more textures to a surface using particular algorithms. If the texture(s) to be applied is (are) defined within the program itself, then changing the texture(s) would require recompiling the program. Thus, shader programs typically use a "texture index" parameter to identify each texture. The state information associated with the shader program includes a "binding," or association, of each texture index parameter to actual texture data.

In multithreaded processors, it is desirable to allow different threads that execute the same program to use different versions of the state information for that program. To the extent that different threads are limited to using the same version of the state information, the ability of the processor to run threads in parallel may be limited. In some instances, each time the state information is to be updated, the processor would need to wait for all threads that use a current version of the state information to finish before launching any new threads that use the updated state information. This can lead to idle time in the processor.

Some multithreaded processors avoid such idle time by providing a separate set of state registers for each thread. Where the number of concurrent threads and the amount of state information required per thread are relatively small, this approach is practical; however, as the number of concurrent threads and/or the amount of state information to be stored per thread becomes larger, providing a sufficiently large register space becomes an expensive proposition.

Further, the amount of state information required per thread can vary. For instance, different shader programs may define different numbers of texture bindings. If the state register is made large enough to accommodate a separate version of the maximum amount of state information for every thread, much of this space may be wasted in cases where the maximum amount of information is not being stored.

It would therefore be desirable to provide more flexible techniques for managing multiple versions of state information.

BRIEF SUMMARY OF THE INVENTION

Embodiments of the present invention provide configurable lookup tables for managing multiple versions of state information and various management schemes optimized to handle different numbers of versions or different amounts of state information per version using the same lookup table structure. In some embodiments, a management scheme can be selected based on the number of items of state information to be stored for each state version. Other embodiments provide specific management schemes for a lookup table implemented using multiple memory circuits, each of which has multiple entries. For example, in a first management scheme, different items of state information belonging to the same state version are stored in different memory circuits, and new state versions are created in the lookup table by copying the items (preferably in parallel) to new locations in the memory circuits. In a second management scheme, different items of state information belonging to the same state version are stored in a subset of the memory circuits, and new state versions are created in the lookup table by making virtual copies of the items in new locations in the memory circuits and making a real copy of an item only when that item changes. In some embodiments, the first management scheme is advantageously used when the number of items of state information per state version does not exceed the number of memory circuits, and the second management scheme is advantageously used when the number of items of state information per state version does exceed the number of memory circuits.

According to one aspect of the present invention, a method for managing state information in a processor uses a lookup table including a number $N_M$ of memory circuits, each memory circuit having multiple entries, wherein entries in different ones of the memory circuits are accessible in parallel. A number $N_S$ of items of state information belonging to a first state version are stored in a first group of entries selected from the entries in the $N_M$ memory circuits. An updated value for a first one of the $N_S$ items of state information is received while the first state version is in use by at least one thread executing in the processor, the first one of the $N_S$ items being stored in an entry in a first one of the $N_M$ memory circuits. In response, a virtual copy of each of the $N_S$ items of state information is created in a second group of entries selected from the entries in the $N_M$ memory circuits, thereby transferring the first state version to the second group of entries. The virtual copy of the first one of the $N_S$ items of state information in the second group of entries is replaced with a real copy of the first one of the $N_S$ items from the first group of entries. The first one of the $N_S$ items in the first group of entries is replaced with the updated value, thereby storing a second state version in the first group of entries.

In some embodiment, the first group of entries is selected such that the $N_S$ items belonging to the first state version are stored using a number of the $N_M$ memory circuits that is less than or equal to $N_M/2$. For instance, the first group of entries may be selected such that a minimum number of the $N_M$ memory circuits are used to store the $N_S$ items belonging to the first state version.

In some embodiments, prior to receiving the updated value for the first one of the $N_S$ items of state information, a signal indicating that a first thread is being launched is received. In response, an association between the first thread and the first state version is stored in a version map table, where the association identifies the first group of entries. Subsequently to receiving the updated value, the association in the version map table between the first thread and the first state version is modified to identify the second group of entries. When a request for one of the $N_S$ items of state information from the first thread is received, the version map table is accessed to determine which group of entries is to be used to respond to the request, and the group of entries determined from the version map is accessed to retrieve the requested item of state information.

In some embodiments, if an updated value for a second one of the $N_S$ items of state information is received while the second state version is not in use, the virtual copy of the second one of the $N_S$ items of state information in the second group of entries is replaced with a real copy of the second one of the $N_S$ items from the first group of entries, and the second one of the $N_S$ items in the first group of entries is replaced with the updated value.

According to another aspect of the present invention, a device for managing state information in a processor includes a lookup table and lookup table updating logic coupled to the lookup table. The lookup table includes a number $N_M$ of memory circuits, each memory circuit having multiple entries, with entries in different ones of the memory circuits being accessible in parallel. The lookup table is configured to store a number $N_S$ of items of state information belonging to a first state version in a first group of entries selected from the entries in the $N_M$ memory circuits. The lookup table updating logic is configured to create a new state version by creating a virtual copy of each of the $N_S$ items of state information in a second group of entries selected from the entries in the $N_M$ memory circuits, thereby transferring the first state version to the second group of entries, replacing the virtual copy of the first one of the $N_S$ items in the second group with a real copy of the first one of the $N_S$ items from the first group, and replacing the first one of the $N_S$ items in the first group with the updated value.

In some embodiments, the device also includes a version map table configured to store an association between each of a plurality of concurrently executing threads in the processor and one of the state versions stored in the lookup table. The device may also include lookup table access logic configured to receive a request for an item of state information from one of the concurrently executing threads and to access the version map table to identify which one of the state versions stored in the lookup table is to be used to satisfy the request. Where this is the case, the lookup table updating logic may be further configured to update the version map, after the virtual copy of each of the $N_S$ items is created in the second group of entries, such that any associations in the version map table that refer to the state version stored in the first group of entries are modified to refer to the second group of entries.

According to still another aspect of the invention, a processor includes a processing core configured to execute multiple threads concurrently and a core interface coupled to the processing core and configured to provide state information to the processing core in response to a request from one of the threads. The core interface includes a lookup table and lookup table updating logic coupled to the lookup table. The lookup table includes a number $N_M$ of memory circuits, each memory circuit having multiple entries, with entries in different ones of the memory circuits being accessible in parallel. The lookup table is configured to store a number $N_S$ of items of state information belonging to a first state version in a first group of entries selected from the entries in the $N_M$ memory circuits. The lookup table updating logic is configured to create a new state version by creating a virtual copy of each of the $N_S$ items of state information in a second group of entries selected from the entries in the $N_M$ memory circuits, thereby transferring the first state version to the second group of entries, replacing the virtual copy of the first one of the $N_S$ items in the second group with a real copy of the first one of the $N_S$ items from the first group, and replacing the first one of the $N_S$ items in the first group with the updated value.

The following detailed description together with the accompanying drawings will provide a better understanding of the nature and advantages of the present invention.

BRIEF DESCRIPTION OF THE DRAWINGS

FIG. 8 is a code listing showing a sequence of commands related to texture bindings according to an embodiment of the present invention;

FIG. 11 is a code listing showing a sequence of commands related to texture bindings according to another embodiment of the present invention;

DETAILED DESCRIPTION OF THE INVENTION

Embodiments of the present invention provide configurable lookup tables for managing multiple versions of state information and various management schemes optimized to handle different numbers of versions or different amounts of state information per version using the same lookup table structure. In some embodiments, a management scheme can be selected based on the number of items of state information to be stored for each state version. Other embodiments provide specific management schemes for a lookup table implemented using multiple memory circuits, each of which has multiple entries. For example, in a first management scheme, different items of state information belonging to the same state version are stored in different memory circuits, and new state versions are created in the lookup table by copying the items (preferably in parallel) to new locations in the memory circuits. In a second management scheme, different items of state information belonging to the same state version are stored in a subset of the memory circuits, and new state versions are created in the lookup table by making virtual copies of the items in new locations in the memory circuits and making a real copy of an item only when that item changes. In some embodiments, the first management scheme is advantageously used when the number of items of state information per state version does not exceed the number of memory circuits, and the second management scheme is advantageously used when the number of items of state information per state version does exceed the number of memory circuits.

System Overview

Figure 1:
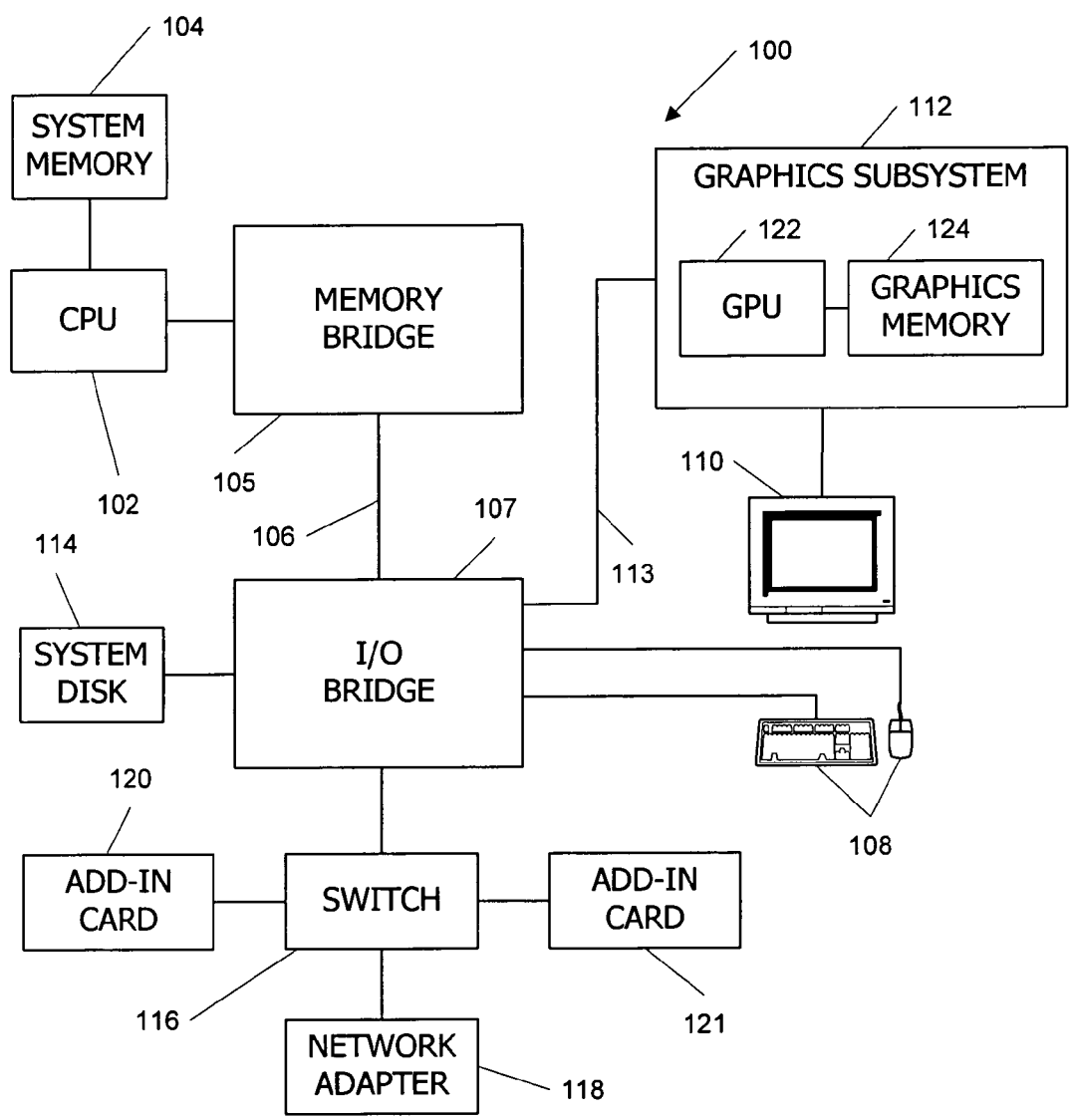
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Accelerated Graphics Port), HyperTransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
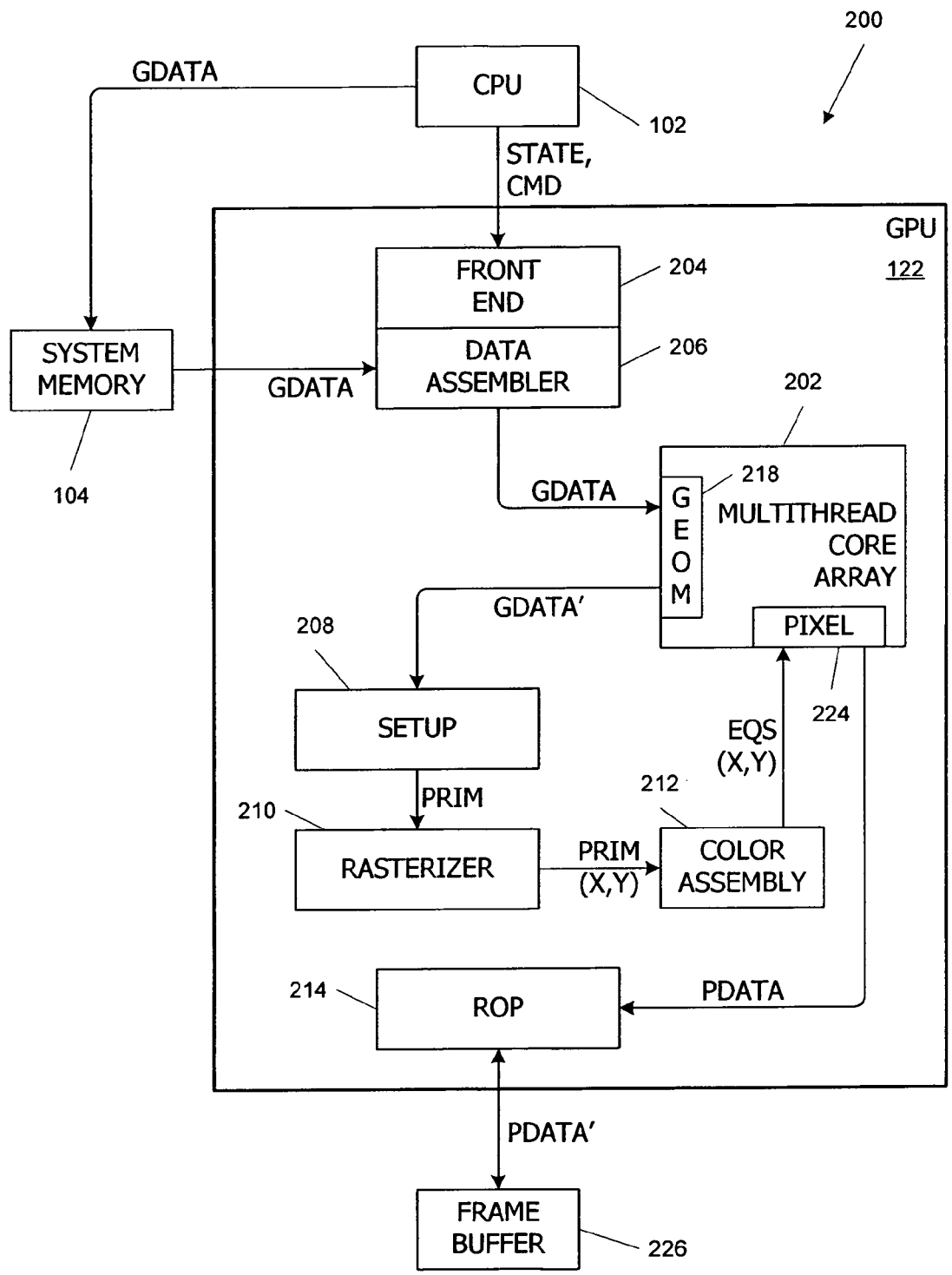
FIG. 2 is a block diagram of a rendering pipeline that can be implemented in a graphics processing unit according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GEOM') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
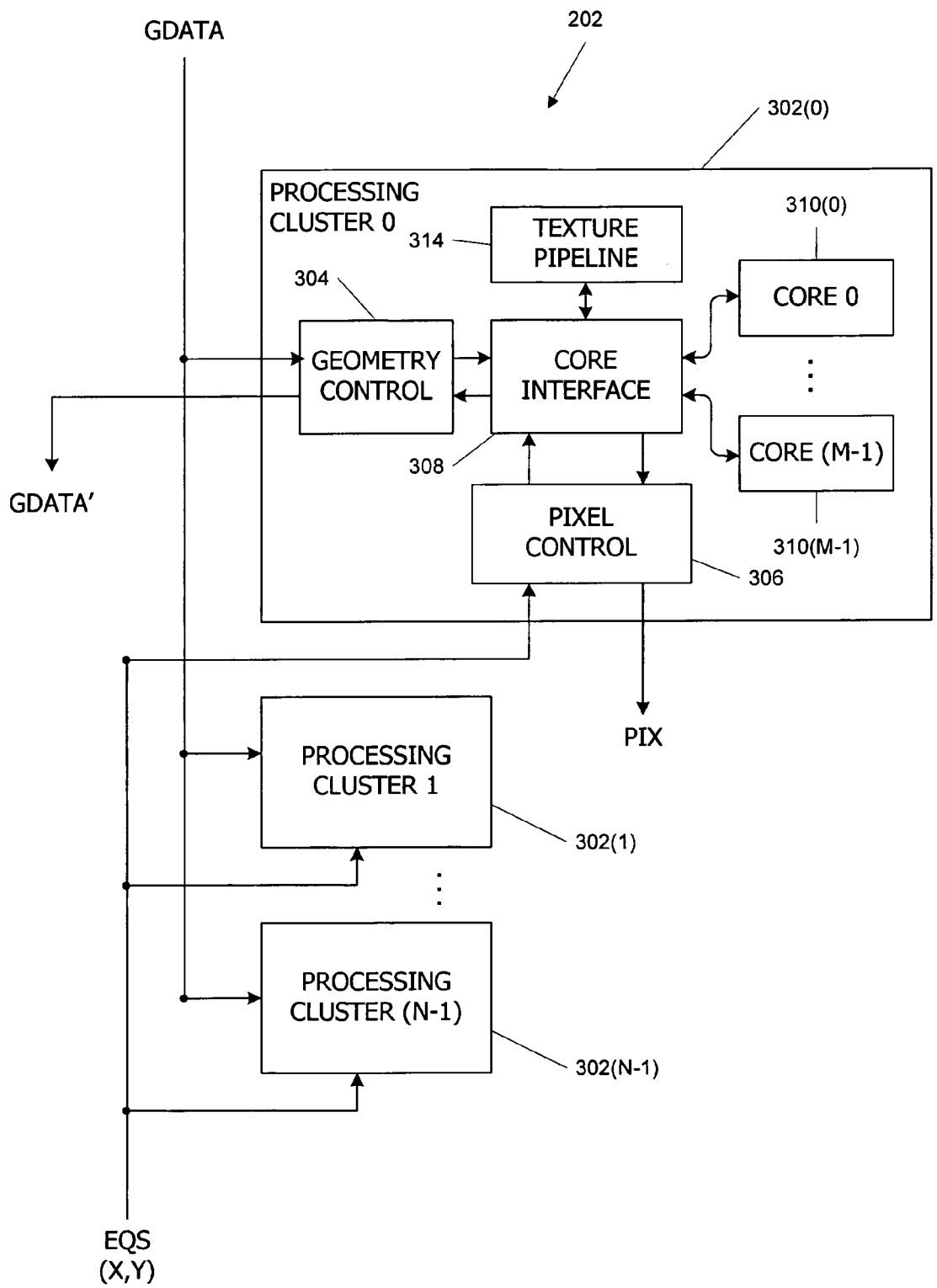
FIG. 3 is a block diagram of a multithreaded core array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. In one embodiment, each core 310 executes threads in single-instruction, multiple data (SIMD) groups (referred to herein as "thread groups"), and multiple SIMD groups can coexist in core 310.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GEOM') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or locations of the pixels in screen space, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it. In still another embodiment, processing clusters can be selected based on properties of the data to be processed, such as the screen coordinates of pixels to be processed.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Texture Request Processing

The present invention relates to management of state information for a multithreaded processor such as processing cluster 302. In one embodiment described below, the state information to be managed includes bindings between texture indices and texture definitions to be used by shader programs. These bindings can be dynamically updated. To facilitate understanding of this embodiment of the invention, texture definitions and texture binding will now be described.

As is known in the art, a texture (as a processing object) can be defined by creating a texture state vector that specifies the pertinent properties of the texture. In one embodiment, the state vector includes a pointer or other reference to a location in memory where the texture data is stored; the reference may be in virtual or physical address space as desired. Other information may also be included, such as the texel format and type of data (color, surface normal, etc.) contained therein, wrap mode (whether the texture is to be applied as a repeating pattern, clamped at the edges, etc.), texture size, and so on.

Figure 4:
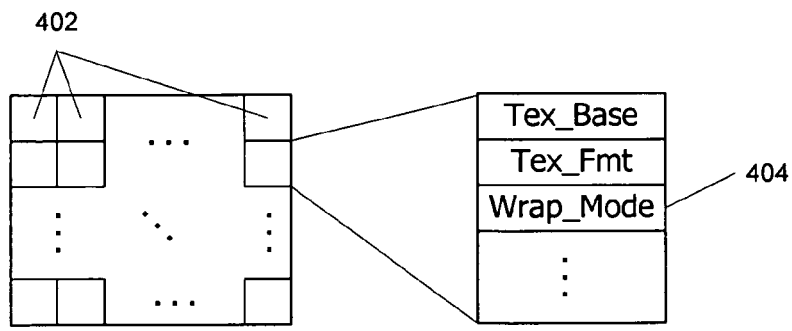
FIG. 4 illustrates a pool of texture state vectors.

In some embodiments, a texture state vector for each defined texture is stored in graphics memory 124 (FIG. 1). More specifically, graphics memory 124 of FIG. 1 may store a pool 400 of texture state vectors, as shown in FIG. 4. Pool 400 advantageously occupies a contiguous block of entries 402 in graphics memory 124. Each entry 402 in pool 400 is identifiable by a "pool index" (PID), which may be an offset relative to a base pointer for pool 400 or any other identifier that uniquely identifies an entry 402. Each entry 402 can store a texture state vector 404 that contains items of state information defining the texture. For instance, the texture base (Tex_Base) is a pointer or other reference to a location in memory (e.g., graphics memory 124 or system memory 104 of FIG. 1) where the texture data is stored. The texture format (Tex_Fmt) defines the format of texels within the texture, e.g., the size of each texel, the type of data (e.g., RGB, surface normal, etc.) stored in each texel and so on. The wrap mode (Wrap_Mode) indicates whether the texture is a repeatable pattern or is to be clamped at the edge. Those skilled in the art will recognize that other properties may also be included in a texture state vector 404 in addition to or instead of those shown in FIG. 4.

Referring to FIG. 1, an application program executing on CPU 102 may define a very large number of textures (up to $2^{21}$ in one embodiment). For each texture defined by the application program, the driver populates an entry 402 in pool 400 of FIG. 4 with a state vector 404 reflecting the definition, thereby assigning a pool index to the texture.

The application program advantageously selects a subset of these textures as being active for a particular rendering operation. For instance, in some embodiments, the application program is allowed to select up to 128 concurrently active textures. The application program assigns each active texture a unique texture index (TID), and the driver program binds the texture index to the pool index where the corresponding texture state vector is stored. The driver program advantageously delivers the bindings to core interface 308 of each processing cluster 302 of FIG. 3, and core interface 308 stores the bindings as described below. The application program may instruct the driver to change some or all of the bindings at any time, and each time a binding is changed, the driver provides an update to core interface 308.

Shader programs (including vertex, geometry and/or pixel shader programs) invoked by the application program may include texture processing instructions. Each texture processing instruction identifies a texture to be used by reference to the texture index TID assigned by the application program; thus, an application program can invoke the same shader program to apply different textures by changing the bindings between texture indices and texture state vectors.

When one of cores 310 encounters a texture processing instruction, it sends a texture request that includes the texture index TID to core interface 308. Core interface 308 uses the stored binding information to identify the corresponding pool index PID and forwards the texture request along with the pool index PID to texture pipeline 314. Texture pipeline 314 uses pool index PID to fetch the texture state vector and uses the texture state vector to control various aspects of texture processing. The operation of texture pipeline 314 is not critical to understanding the present invention, and a detailed description has been omitted.

Figure 5:
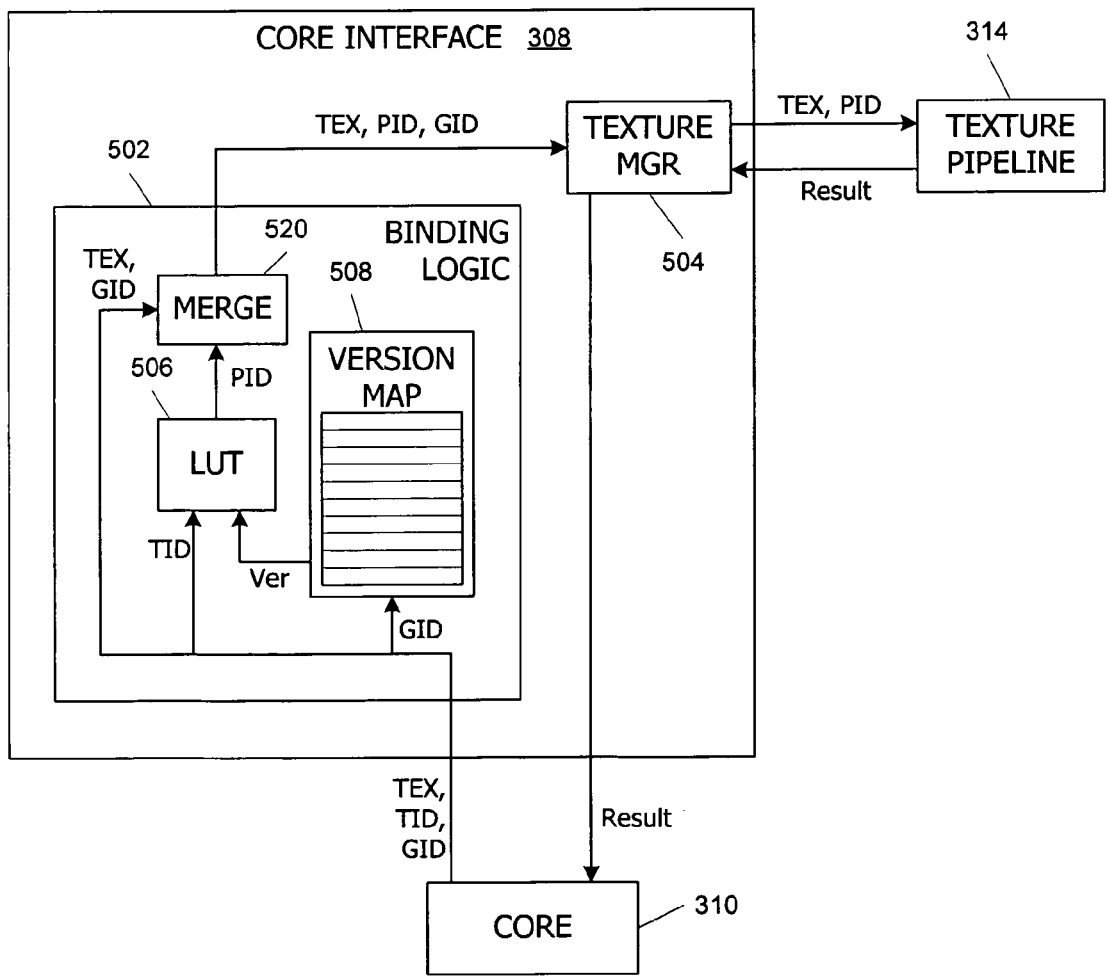
FIG. 5 is a simplified block diagram of a core interface for handling texture processing commands according to an embodiment of the present invention.

FIG. 5 is a simplified block diagram of core interface 308, core 310, and texture pipeline 314 showing the handling of texture processing commands according to an embodiment of the present invention. Core interface 308 includes binding logic 502 and a texture management unit 504. As described above, core 310 can execute multiple threads (or multiple thread groups) concurrently. Different threads may be launched at different times, and the bindings of texture indices TID to pool indices PID may change between launching of successive thread groups. Thus, core interface 308 advantageously maintains multiple versions of the texture binding information.

As shown in FIG. 5, core 310 transmits a texture request (TEX) to core interface 308 in response to a texture processing instruction. The texture request TEX, which may be of a generally conventional nature, may include various information such as the type of processing to be done (e.g., bilinear or trilinear filtering), applicable texture coordinates, and so on. Along with the texture request, core 310 provides the texture index TID to be used in processing the request and a thread identifier (GID) of the thread (or thread group) where the request originated.

Within core interface 308, binding logic 502 determines the pool index PID that is bound to the texture index TID within the context of the requesting thread identified by GID. More specifically, binding logic 502 includes a lookup table (LUT) 506 that can store multiple versions of the texture index bindings. In preferred embodiments, the number of versions that can be stored in lookup table 506 is configurable and depends on the number of bindings that are in use, as described below. Binding logic 502 also includes a version map 508 that identifies which version of the bindings each thread (or thread group) is using.

In response to a texture request from core 310, binding logic 502 first accesses version map 508 using the thread identifier GID to determine which version (VER) of the binding information in lookup table 506 is applicable to the requesting thread. Then, using the version VER and the texture index TID, binding logic 502 accesses lookup table 506 to determine a pool index PID.

Merge block 510 collects the texture request TEX, the thread identifier GID, and the pool index PID and forwards them to texture manager 504. Texture manager 504 issues the request TEX, together with the pool index PID, to texture pipeline 304, which processes the request and returns the result. Texture manager 504 associates the received result with the requesting thread and transmits the result to core 310. A detailed description of the operation of merge block 510 and texture manager 504 is omitted as not being critical to understanding the present invention.

Those skilled in the art will recognize that core interface 308 may operate with only one version of the texture bindings in lookup table 506. In this configuration, however, each time any of the bindings changed, core interface 308 would have to wait for all threads that might invoke texture processing with the current version of the bindings to finish before updating lookup table 506 or launching further threads. If the bindings change frequently enough, core 310 might operate at less than full capacity, reducing overall performance. Maintaining multiple versions of the bindings would reduce or eliminate this potential bottleneck.

On the other hand, maintaining multiple versions of the bindings could become expensive. For example, in the forthcoming DX10 graphics API (application program interface) by Microsoft Corp., an application program will be allowed to define up to 128 concurrent texture bindings. Storing multiple versions of 128 bindings requires a large lookup table 506. While building such a table is possible, a more compact solution is desirable, particularly if many rendering applications are likely to use significantly fewer than 128 bindings.

Configurable Version Management

In accordance with an embodiment of the present invention, lookup table 506 includes enough entries to store at least one version of the bindings if the maximum allowed number of bindings are defined. (For instance, in the case of DX10, lookup table 506 would have at least 128 entries.)

Where fewer bindings are defined, the same lookup table 506 can be used to store more versions of the bindings. The number of versions that can be stored depends on the number ($N_S$) of bindings that each version includes and the number ($N_E$) of entries in the lookup table. In one embodiment, the driver program provides the number $N_S$ of bindings to core interface 308 during initialization of the application program. Based on this information, core interface 308 configures lookup table 506 to store a number ($N_V$) of versions of the bindings, with the number $N_V$ being chosen such that $N_V * N_S \leq N_T$.

In some embodiments, the number $N_V$ of versions is determined based on the number $N_S$ of bindings, rounded up to the nearest power of 2. For instance, if lookup table 506 has $N^T = 2^k$ entries for some integer k and the number $N_S$ of bindings rounds up to $2^n$ for n then the number of versions that can be concurrently maintained is $N_V = 2^{k-n}$.

Lookup table 506 can be implemented as one or more random access memories. As used herein, the term "random access memory," or "RAM," refers generally to any memory circuit with multiple storage locations ("entries") sharing a read and/or write port. The number ($N_M$) of RAMs and number ($N_E$) of entries per RAM may be chosen as desired, with $N_T = N_M * N_E$. Where lookup table 506 is implemented using a single RAM with NT entries, different entries in the same RAM would generally be written sequentially (since the entries all share a write port); consequently, updating of bindings may be relatively slow.

Figure 6:
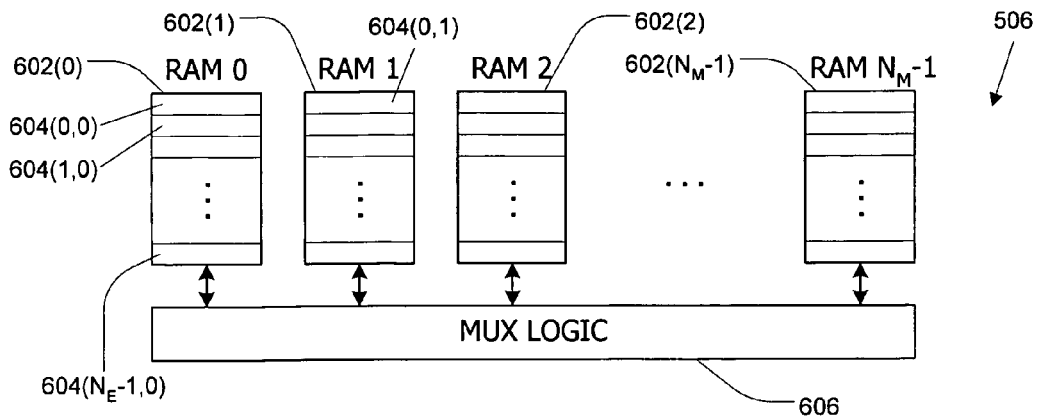
FIG. 6 is a diagram of a lookup table implemented using multiple interconnected RAMs according to an embodiment of the present invention.

As shown in FIG. 6, in some embodiments of the present invention, lookup table 506 is advantageously implemented using multiple interconnected RAMs 602, each of which has multiple entries 604. Each RAM 602 is connected to multiplexing (mux) logic 606 that provides configurable connections between different RAMs 602. In some embodiments, mux logic 606 may provide a full crossbar switch among all RAMs 602; in other embodiments, less than a full crossbar switch is used.

Implementation of mux logic 606 depends in part on the particular management scheme (or schemes) used to manage data storage in lookup table 506. A "management scheme" includes a particular arrangement of data for a first version of the bindings (or other state information) in RAMs 602 (e.g., whether different items of information in the first version are stored in the same RAM 602 or different RAMs 602) as well as a particular set of rules for selecting entries to store future versions of the state information (e.g., copying to entries in the same RAM 602 or in different RAMs 602). It should be noted that the management scheme will also affect which entry binding logic 502 accesses in lookup table 506 when responding to texture requests. Examples of management schemes are described below, and persons having ordinary skill in the art will be able to design appropriate mux logic circuits to support these schemes.

The number $N_M$ of RAMs 602 may be selected as desired. In one embodiment, lookup table 506 has a total of $N_T = 2^k$ entries. If k is even, then $N_M = 2^{k/2}$ RAMs 602 with $N_E = 2^{k/2}$ entries each are used. If k is odd, then $N_M = 2^{(k-1)/2}$ RAMs with $N_E = 2^{(k+1)/2}$ entries each are used. Other combinations of the number $N_M$ of RAMs and number $N_E$ of entries per RAM may be used, as long as $N_M * N_E$ is at least as large as the maximum number $N_S$ of bindings per version that the system supports (e.g., 128 in the case of DX10).

Where the number $N_S$ of active bindings is less than $N_T/2$, multiple versions of the bindings can be stored in lookup table 506. Bindings for different versions can be stored and managed using RAMs 602 in various configurations. Two examples of schemes for managing multiple versions of bindings using RAMs 602 will now be described. In some embodiments, binding logic 502 in core interface 310 (see FIG. 5) selects a management scheme for RAMs 602 based on the maximum number of bindings $N_S$ that the application program is expected to define.

Version Management Scheme with Parallel Copying

In some embodiments, different bindings from the same version are stored in different RAMs 602; a new version is created by copying the existing bindings from one entry to another in the same RAM (or to entries in a different subset of the RAMs), then updating one or more of the bindings in the new location. For example, referring to FIG. 6, a first binding might be stored in entry 604(0,0) of RAM 602(0), a second binding in entry 604(0,1) of RAM 602(1) and so on until the maximum number of bindings $N_S$ is reached. As long as $N_S$ does not exceed $N_M$, each binding in a single version advantageously occupies a different one of RAMs 602.

When a binding is updated, the current bindings (assuming they are in use by at least one thread in core 310) can be copied in parallel to the next entry in the same RAM 602, or in some instances to entries in another subset of the RAMs 602. The changed binding is then updated to create a new version.

Figure 7:
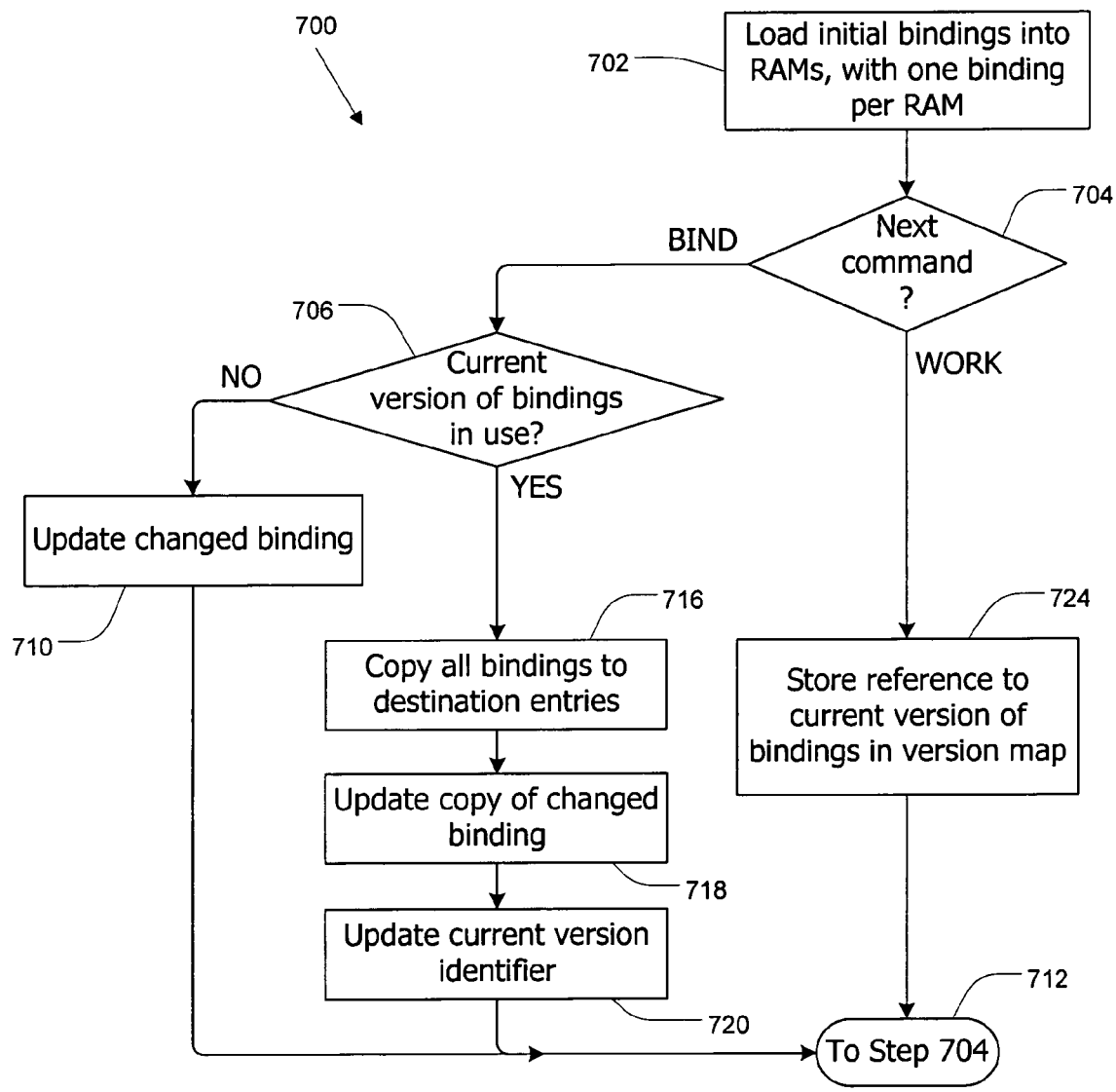
FIG. 7 is a flow diagram of a logic process for managing the lookup table of FIG. 6 using parallel copying according to an embodiment of the present invention.

FIG. 7 is a flow diagram of a logic process 700 for managing lookup table 506 according to an embodiment of the present invention using parallel copying. Process 700 can be implemented, e.g., in binding logic 502 of core interface 308 shown in FIG. 5.

At step 702, an initial set of bindings is loaded into RAMs 602, with one binding being stored per RAM. At step 704, binding logic 502 begins to receive commands, including binding-update (BIND) commands and commands (WORK) that indicate thread launch. In one embodiment, core interface 308 receives all commands and delivers to binding logic 502 only those commands that affect its operation. It is to be understood that binding logic 502 may also receive other input, including texture (TEX) requests from core 310 as described above, and core interface 308 may also receive and process commands that are not relevant to operation of binding logic 502.

Each BIND command in this embodiment includes a definition (or redefinition) for one of the bindings. For instance, the BIND command may specify the texture index TID that is to be defined or redefined and the pool index PID to which texture index TID is to be bound. Once created, a binding persists until modified by a subsequent BIND command. Thus, in response to each BIND command, binding logic 502 incrementally updates the binding information in RAMs 602 as described below.

Each WORK command indicates that a thread (or thread group) is being launched. Once a thread is launched, all texture requests from that thread are advantageously processed using the version of the bindings that was current at the time the thread was launched, regardless of any subsequent BIND commands. Binding logic 502 advantageously uses version map 508 to identify which version of the bindings stored in lookup table 506 was current at the time of each WORK command. In embodiments described herein, version map 508 includes an entry corresponding to each thread identifier (GID), and each WORK command specifies the thread identifier GID for the newly launched thread. In response to each WORK command, binding logic 502 populates an entry in version map 508 with version-identifying information as described below.

More specifically, as shown in FIG. 7, in the event of a BIND command at step 704, binding logic 502 determines (step 706) whether the current version of the bindings is in use by at least one thread (or thread group). For instance, binding logic 502 may consult version map 508, which lists the version of the bindings in use by each active thread, to determine whether an index corresponding to the current version is present therein. Alternatively, binding logic 502 may maintain a count of active threads (or thread groups) for each version of the bindings existing in lookup table 506. If the count is zero, then the current bindings are not in use; otherwise, the current bindings are in use.

If the current bindings are not in use, the changed binding can be updated at step 710 without creating a new version, and process 700 loops back (step 712) to step 704 to handle the next command.

If, at step 706, it is determined that the current bindings are in use, then a new version is created by copying the bindings and updating the copy of the binding that is changed by the BIND command. More specifically, at step 716, all of the current bindings in RAMs 602 are copied from their current ("source") entries to new ("destination") entries. Each binding may be copied to a different entry in the same RAM 602 or to a different RAM 602; the destination entry for each binding is advantageously selected such that all bindings may be copied in parallel. In some embodiments, destination entries are also selected such that a predictable mapping between texture index TID and location in RAM 602 is maintained for each version of the bindings.

If sufficient space for copying all of the bindings is not available in lookup table 506, process 700 may stall any further updating of bindings or launching of threads until such time as space becomes available. Space becomes available when a version of the bindings stored in lookup table 506 ceases to be in use by any threads. It is to be understood that stalling by process 700 does not stall execution of existing threads by core 310; thus, space to store a new version of binding information will eventually become available, allowing process 700 to proceed.

At step 718, the copy of the changed binding at the destination location is updated, leaving the binding at the source location unmodified. At step 720, a current version identifier maintained by binding logic 502 is updated to refer to the new set of copies (i.e., the destination entries of the copy operation of step 716) that includes the updated binding. Process 700 loops back (step 712) to step 704 to handle the next command.

Referring back to step 704, if a WORK command is received, the new thread (or thread group) becomes associated with the current version of the bindings. More specifically, at step 724, binding logic 502 stores the current version identifier (defined at step 720) in the entry in version map 508 that corresponds to the thread identifier GID. Process 700 then loops back (step 712) to step 704 to handle the next command.

It is to be understood that WORK commands and BIND commands may be received in any order. Any number (including zero) of WORK commands may be received between subsequent BIND commands. As noted above, as long as no threads are using the current version of the bindings, current bindings can be overwritten without creating a new version. Any number of threads may be launched with the same version of the bindings.

To further illustrate the operation of process 700, reference is made to FIG. 8 and FIGS. 9A-9E. FIG. 8 is a code listing showing a sequence of BIND and WORK commands that might be received by binding logic 502, and FIGS. 9A-9E show the content of lookup table 506 and version map 508 at different times in the execution of the command sequence shown in FIG. 8. In FIGS. 9A-9E, lookup table 506 includes four RAMs 602, and version map 508 includes entries for eight thread identifiers (GID). It is to be understood that this configuration is illustrative and not limiting.

As indicated in FIG. 8, the maximum number of bindings in this example is $N_S=2$, which is less than the number of RAMs 602. Each binding is represented as a code of the form b$i$u$j$, where integer $i$ identifies the texture index TID to which the binding pertains and integer $j$ indicates the number of times the binding has been updated from its initial value. Thus, b0u0 is the original binding for texture index TID=0, b1u2 is the second update to the binding for texture index TID=1, and so on.

Figure 9A:
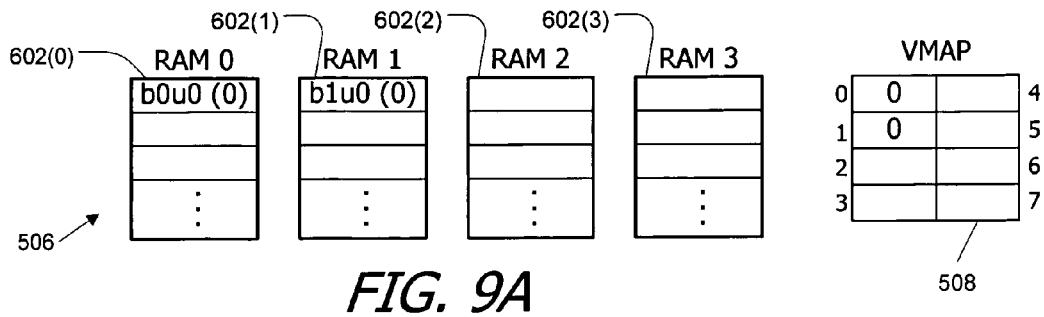
FIGS. 9A-9E show the content of the lookup table of FIG. 6 at different times in the execution of the command sequence shown in FIG. 8 according to an embodiment of the present invention.

FIG. 9A shows the content of lookup table 506 and version map 508 after execution of WORK command 802 of FIG. 8. As a result of the preceding BIND commands 804 and 806, RAM 602(0) stores the binding b0u0 while RAM 602(1) stores the binding b1u0. Version map 508 associates thread identifiers 0 and 1 with version "0" of the bindings; the parenthetical number (0) in RAMs 602(0) and 602(1) marks the entries that correspond to the version-0 bindings.

Figure 9B:
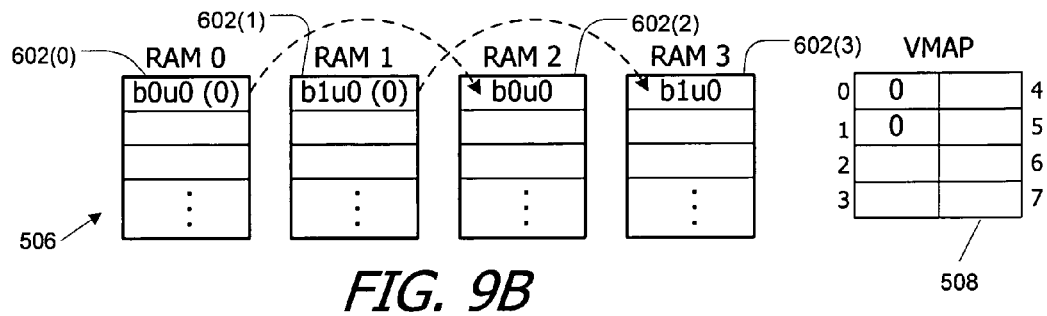

FIG. 9B shows the content of lookup table 506 and version map 508 during execution of BIND command 808 of FIG. 8. The bindings in RAMs 602(0) and 602(1) have been copied to corresponding entries in RAMs 602(2) and 602(3) respectively, in accordance with step 716 of process 700 of FIG. 7. Steps 718 and 720 have not yet been executed.

Figure 9C:
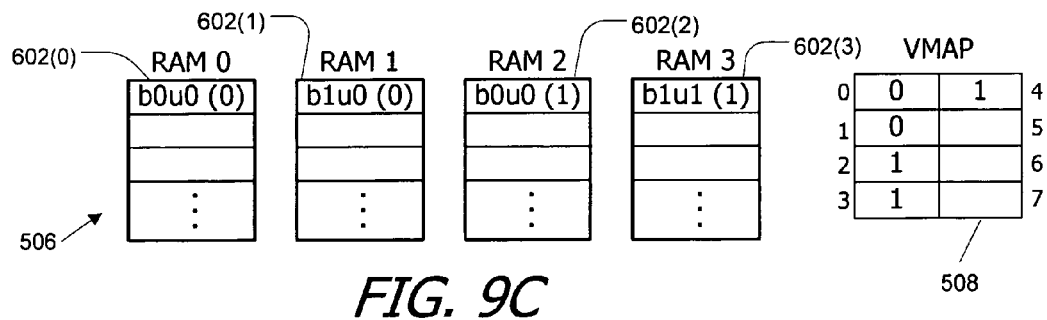

FIG. 9C shows the content of lookup table 506 and version map 508 after execution of WORK command 810 of FIG. 8. RAM 602(4) has been updated with the new binding b1u1, completing the execution of BIND command 808. Version map 508 associates thread identifiers 2, 3, and 4 with version 1 of the bindings; the parenthetical (1) in RAMs 602(2) and 602(3) marks the entries that correspond to the version-1 bindings.

Figure 9D:
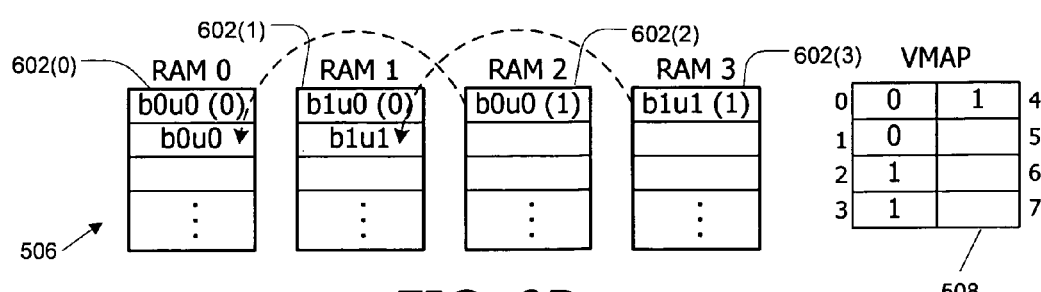

FIG. 9D shows the content of lookup table 506 and version map 508 during execution of BIND command 812 of FIG. 8. The version-1 bindings in RAMs 602(2) and 602(3) have been copied to available destination entries in RAMs 602(0) and 602(1), respectively, in accordance with step 716 of process 700 of FIG. 7. Steps 718 and 720 have not yet been executed.

Figure 9E:
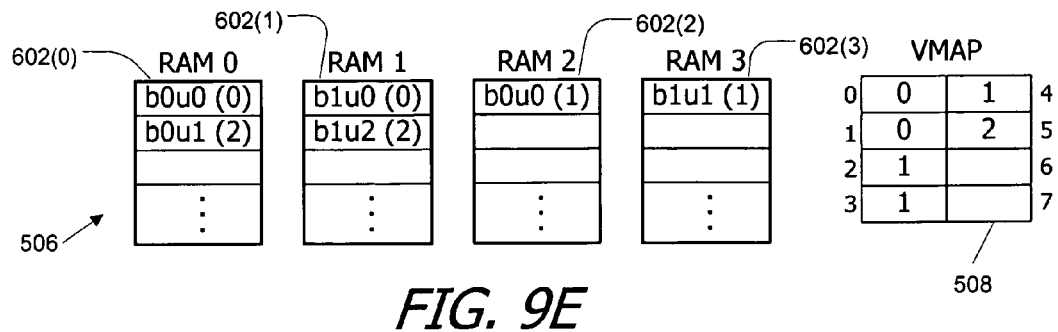

FIG. 9E shows the content of lookup table 506 and version map 508 after execution of WORK command 814 of FIG. 8. Version map 508 associates thread identifier 5 with version 2 of the bindings; the parenthetical (2) in RAMs 602(0) and 602(1) marks the entries that correspond to the version-2 bindings. It should be noted that after RAM 602(0) was updated to contain new binding b0u1 specified in BIND command 808, BIND command 812 was executed without making a further copy of the bindings (in accordance with step 710 of process 700) since no threads were launched with the set of bindings b0u1 and b1u1.

Proceeding in this manner, lookup table 506 shown in FIGS. 9A-9E can store up to $2*N_E$ versions of the bindings, where $N_E$ is the number of entries in each RAM 602. As long as the number $N_S$ of bindings per version does not exceed the number $N_M$ of RAMs 602, the copy operations at step 716 of process 700 of FIG. 7 can all be performed in parallel, supporting fast updating of the bindings.

It will be appreciated that the management scheme of process 700 described herein is illustrative and that variations and modifications are possible. Steps described as sequential may be executed in parallel, order of steps may be varied, and steps may be modified or combined.

Those skilled in the art will recognize that the order in which entries in lookup table 506 become populated is a matter of design choice. For instance, in some embodiments, successive versions of the bindings may be stored in different entries in the same subset of RAMs 602 (e.g., RAMs 602(0) and 602(1)) until enough versions have been stored to fill those RAMs before filling any entries in RAMs 602(2) and 602(3). As long as it is the case that no RAM 602 stores more than one binding of the current version, copying of all bindings in preparation for an update can be accomplished in parallel.

Further, it is not required that entries for new versions be written or overwritten in any particular order. For instance, referring to FIG. 9E, the version 0 bindings in RAMs 602(0) and 602(1) cannot be overwritten until threads 0 and 1 have completed, and the version 1 bindings in RAMs 602(2) and 602(3) cannot be overwritten until threads 2, 3, and 4 have completed. In some embodiments, if all of threads 2, 3 and 4 complete before both of threads 0 and 1 have completed, the entries in RAMs 602(2) and 602(3) that hold the version-1 bindings can be overwritten even if threads 0 and/or 1 have not completed.

Version Management Scheme Using Virtual Copying

Process 700 may also be used to manage lookup table 506 in cases where the number $N_S$ of bindings exceeds the number $N_M$ of RAMs 602 by storing a second binding in one or more of RAMs 602. Where multiple bindings are stored in the same RAM, multiple cycles will be needed to copy the bindings when a new version is created, leading to some slowness in operation.

According to another embodiment of the present invention, an alternative management scheme uses virtual copying to allow multiple bindings to be "copied" from the same RAM in parallel. This scheme is advantageously used when the number $N_S$ of bindings exceeds the number $N_M$ of RAMs.

In a virtual-copying embodiment, one (or more) of RAMs 602 is designated as the "current" RAM. The current RAM (or RAMs) always holds the current version of the bindings. Older versions of the bindings are stored in the other RAMs 602, either as real copies or virtual copies from the current RAM (or RAMs). Each entry in any non-current RAM 602 that is in use has associated therewith a "virtual/real" flag. The flag is set to the "real" (R) state if actual binding data is stored therein and to the "virtual" (V) state if the binding data is stored in the current RAM.

Figure 10:
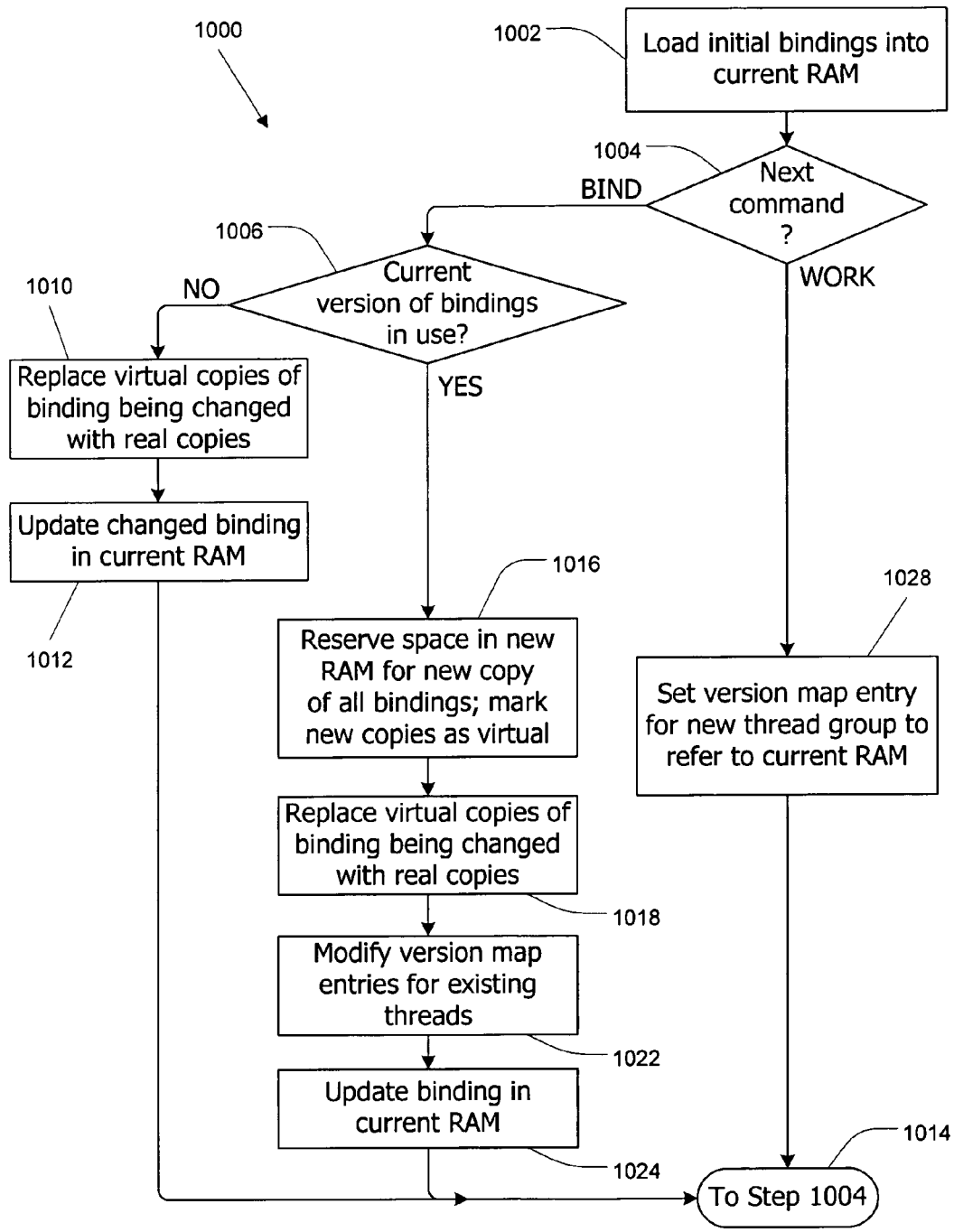
FIG. 10 is a flow diagram of a logic process for managing the lookup table of FIG. 6 using virtual copying according to an embodiment of the present invention.

FIG. 10 is a flow diagram of a process 1000 for managing lookup table 506 according to an embodiment of the present invention that employs virtual copying. Process 1000 can be implemented, e.g., in binding logic 502 of core interface 308 shown in FIG. 5.

At step 1002, an initial set of bindings are loaded into the current RAM, which for purposes of illustration is designated herein as RAM 602(0). If the number of bindings per version exceeds the number of entries in RAM 602(0), one or more additional RAMs 602 may also be used as current RAMs. Thus, although the present description may refer to a single current RAM 602(0), it is to be understood that multiple RAMs 602 may be used to store a single version of the bindings. The smallest possible number of current RAMs, given the number of bindings and size of the RAMs, is advantageously used.

At step 1004, binding logic 502 begins to receive commands, including binding update commands (BIND) and commands indicating thread launch (WORK). These commands may be identical to the BIND and WORK commands described above with reference to FIG. 7.

In the event that a BIND command is received at step 1004, binding logic 502 determines (at step 1006) whether the current version of the bindings is in use by at least one thread (or thread group). As described above with reference to FIG. 7, binding logic 502 may make this determination by consulting version map 508 or a separate count of active threads for each version of the bindings existing in lookup table 506.

If, at step 1006, it is determined that the current bindings are in use, then a new version is created. At step 1016, space is reserved in one of RAMs 602 other than the current RAM 602(0) as destination space for the current version of the bindings; the reserved space is large enough to store the complete set of current bindings. (If the number $N_S$ of bindings exceeds the number $N_E$ of entries in each RAM 602, space in multiple unused RAMs 602 would be reserved.) In one embodiment, reserving space at step 1016 includes setting the real/virtual flag for each entry in the reserved space to the virtual (V) state.

As described above with reference to process 700, if sufficient space is not available at step 1016, process 1000 advantageously stalls any further updating of bindings or launching of threads. Existing threads in core 310 advantageously continue to execute, and space for a new version of the bindings eventually will become free, allowing process 1000 to proceed.

At step 1018, any virtual copies of the binding that is to be changed by the BIND command are replaced with real copies. In one embodiment, the replacement is accomplished in a single clock cycle by broadcasting the version of the binding that is stored in current RAM 602(0) to each RAM 602 for which the virtual/real flag for the entry corresponding to that binding is set to the virtual state, including the entry in the newly reserved space. The other RAMs 602 can each receive and write the data in parallel, regardless of how many RAMs 602 require real copies of the binding.

At step 1020, any entries in version map 508 that refer to current RAM 602(0) are modified to refer to the new space. At step 1022, the binding in current RAM 602(0) is updated. Because the version map entries for existing threads were modified at step 1020, bindings used by these threads are not affected by the update to RAM 602(0) at step 1022. Process 1000 then loops back (step 1012) to step 1004 to handle the next command.

Referring back to step 1006, if the current bindings are not in use, the changed binding can be updated in current RAM 602(0) without creating a new version. However, virtual copies of the changed binding in other RAMs 602 need to be replaced with real copies prior to updating the binding in RAM 602(0). Accordingly, at step 1010, any virtual copies of the binding that is to be changed by the BIND command are replaced with real copies; implementation of this step can be identical to step 1018 described above. At step 1012, the entry in current RAM 602(0) is modified to update the binding. Process 1000 then loops back (step 1012) to step 1004 to handle the next command.

Referring back to step 1004, in response to a WORK command including a thread identifier GID, binding logic 502 stores (at step 1028) an identifier referring to current RAM 602(0) in the entry in version map 508 that corresponds to the thread identifier GID. Process 1000 then loops back (step 1012) to step 1004 to handle the next command.

As in process 700, WORK commands and BIND commands may be received in any order, and any number (including zero) of WORK commands may be received between subsequent BIND commands. As noted above, as long as no threads are using the current version of the bindings, current bindings can be overwritten without creating a new version, although virtual copies of the binding being overwritten may need to be replaced with real copies. Any number of threads may be launched with the same version of the bindings.

To further illustrate the operation of process 1000, reference is made to FIG. 11 and FIGS. 12A-12F. FIG. 1 is a code listing showing a sequence of BIND and WORK commands that might be received by binding logic 502, and FIGS. 12A-

12F show the content of lookup table 506 and version map 508 at different times in the execution of the command sequence shown in FIG. 11. In FIGS. 12A-12F, lookup table 506 includes four RAMs 602 with four entries each, and version map 508 includes entries for eight thread identifiers (GID). Each RAM 602 is shown as having a virtual/real flag 1202 for each entry therein; the flags 1202(0) in RAM 602(0) are always in the real (R) state, and in some embodiments, these flags may be omitted. It is to be understood that this configuration is illustrative and not limiting.

As indicated in FIG. 11, the maximum number of bindings in this example is $N_S=4$, which is equal to the number of RAMs 602. As in FIG. 8, each bindings is represented as a code of the form biuj, where integer i identifies the texture index TID to which the binding pertains and integer j indicates the number of times the binding has been updated from its initial value.

Figure 12A:
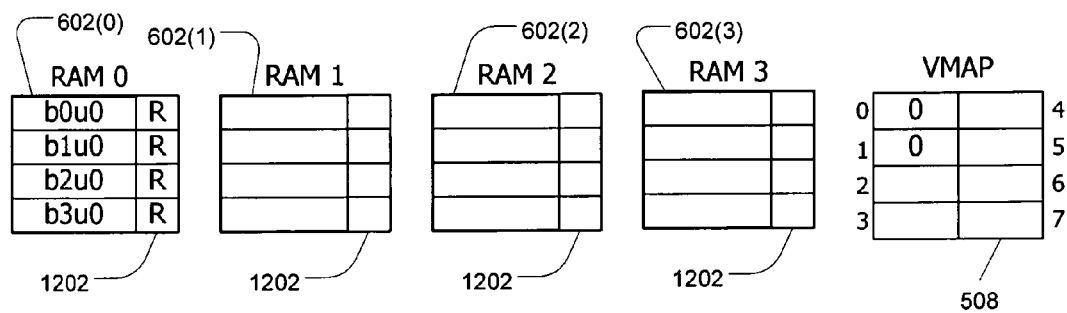
FIGS. 12A-12F show the content of lookup table of FIG. 6 at different times in the execution of the command sequence shown in FIG. 11 according to an embodiment of the present invention.

FIG. 12A shows the content of lookup table 506 and version map 508 after execution of WORK command 1102 of FIG. 11. As a result of the preceding BIND commands 1104, current RAM 602(0) stores the bindings b0u0, b1u0, b2u0, and b3u0; the other RAMs 602(1), 602(2) and 602(3) are empty. After execution of WORK command 1102, version map 508 associates thread identifiers 0 and 1 with the current RAM 602(0); in this example, the numbers stored in version map 508 correspond directly to the RAM identifiers.

Figure 12B:
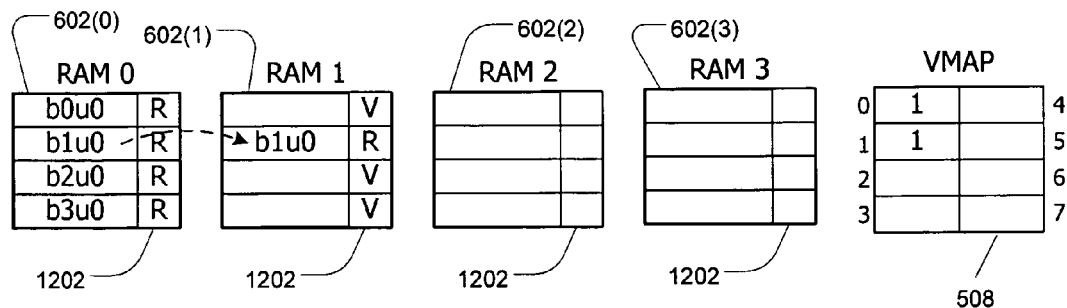

FIG. 12B shows the content of lookup table 506 and version map 508 during execution of BIND command 1106 of FIG. 11. RAM 602(1) has been reserved and its virtual/real flags 1202(1) set to the virtual (V) state, in accordance with step 1016 of process 1000 described above. Further, in accordance with step 1018, a real copy of binding b0u0, which is to be updated, has been created in RAM 602(1); this copy has its virtual/real flag set to the real (R) state. In accordance with step 1020, version map 508 has been updated so that threads 0 and 1 are now associated with the version of the bindings in RAM 602(1). Step 1022 has not yet been executed; when it is executed, binding b1u0 in RAM 602(0) will be updated to b1u1 as specified in BIND command 1106.

It should be noted that at this point, RAM 602(1) includes a real copy of binding b1u0 and virtual copies of the other three bindings. Binding logic 502 interprets the virtual state of a real/virtual flag 1202 as a reference to a corresponding entry in current RAM 602(0). For instance, if at the point in time illustrated in FIG. 12B, thread 0 were to send a texture request referencing texture index 2, binding logic 502 would first access version map 508 to determine that the bindings in RAM 602(1) are to be used; upon determining that the binding for texture index 2 in RAM 602(1) is a virtual copy, binding logic 502 would refer to current RAM 602(0) to determine that binding b2u0 is to be used to satisfy the request. Thus, a virtual copy can persist as long as the binding in current RAM 602(0) does not change.

Figure 12C:
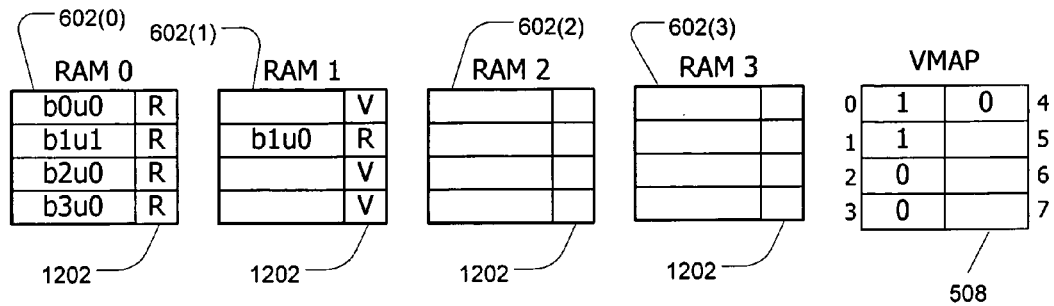

FIG. 12C shows the content of lookup table 506 and version map 508 after execution of WORK command 1108 of FIG. 11. Current RAM 602(0) has been updated with the new binding b1u1, completing execution of BIND command 1104. Version map 508 associates thread identifiers 2, 3, and 4 with the current version of the bindings in current RAM 602(0). Thread identifiers 0 and 1 remain associated with the version in RAM 602(1).

Figure 12D:
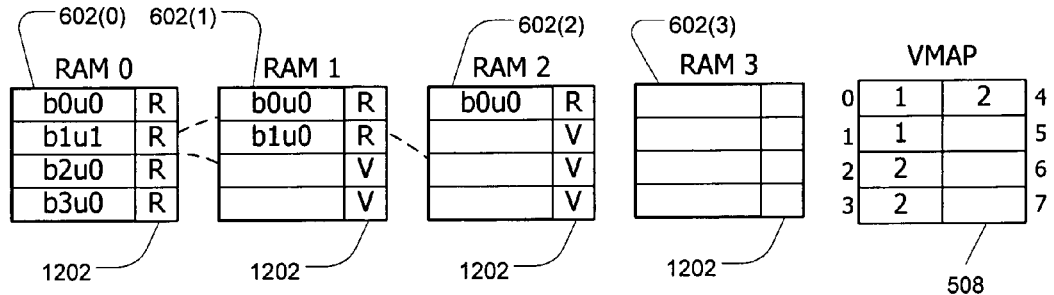

FIG. 12D shows the content of lookup table 506 and version map 508 during execution of BIND command 1110 of FIG. 11. In accordance with step 1016 of process 1000 of FIG. 10, space has been reserved in RAM 602(2), and all virtual/real flags therein have been set to the virtual state. In accordance with step 1018, the virtual copies of binding b0u0 in RAMs 602(1) and 602(2) have been replaced with real copies. Both replacements can be made in a single clock cycle, e.g., by broadcasting the binding b0u0 from current RAM 602(0) to both of RAMs 602(1) and 602(2), which can write the value in parallel with each other. In accordance with step 1020, version map 508 has been modified so that thread identifiers 2, 3, and 4, which formerly referred to current RAM 602(0), now refer to RAM 602(2).

Figure 12E:
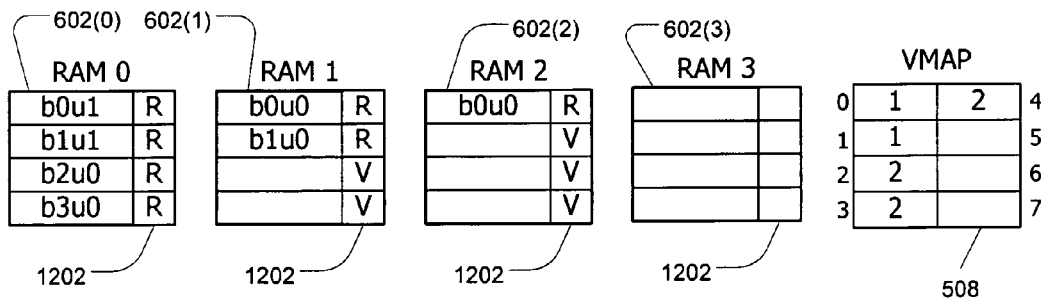

FIG. 12E shows the content of lookup table 506 and version map 508 after completion of BIND command 1110. Binding b0u0 in current RAM 602(0) has been replaced with binding b1u1. This does not affect the bindings for executing threads, all of which are determined by reference to RAM 602(1) or RAM 602(2) as indicated in version map 508.

Figure 12F:
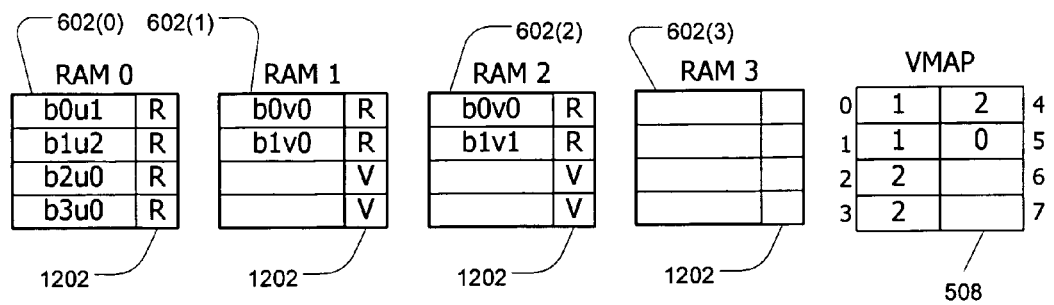

FIG. 12F shows the content of lookup table 506 and version map 508 after completion of WORK command 1112. BIND command 1114 has been executed in accordance with steps 1010 and 1012 of process 1000: the virtual copy of binding b1u1 in RAM 602(2) has been replaced with a real copy, and the new binding b1u2 has been stored in current RAM 602(0). In response to WORK command 1112, version map 508 has been updated so that thread index 5 is associated with current RAM 602(0).

Proceeding in this manner, lookup table 506 can store up to $N_M$ versions of the bindings, where $N_M$ is the number of RAMs 602. As long as each BIND command affects only one binding, all necessary copying can be accomplished in a single clock cycle by relying on virtual copying as described above.

As noted above, if the number $N_S$ of bindings exceeds the number $N_E$ of entries in a single RAM 602, then multiple RAMs 602 may be used as the "current RAM" and as the RAM for each old version. Where this is the case, the number $N_V$ of versions that can be concurrently stored will be less than the number $N_M$ of RAMs. As long as at least one version of the bindings can be stored, core 310 can continue to operate.

It will be appreciated that the virtual copying scheme described herein is illustrative and that variations and modifications are possible. Steps described as sequential may be executed in parallel, order of steps may be varied, and steps may be modified or combined. It is not required that the RAMs become populated or overwritten in any particular order. Further, process 1000 may also be used where the number of bindings $N_S$ is less than the number of entries $N_E$ per RAM. In some embodiments, if the number of bindings $N_S$ is less than half the number of entries $N_E$, then two versions of the bindings could coexist in the same RAM, although more complex logic for identifying an entry in the current RAM corresponding to a particular virtual copy may be required.

Configurable Management Scheme

In some embodiments, binding logic 502 selects a version management scheme based on the number of bindings per version. For example, binding logic 502 may be capable of executing process 700 and process 1000. The graphics driver program advantageously notifies binding logic 502, e.g., during program initialization, how many bindings are to be expected; in some embodiments, the application program provides this information to the driver program. In one embodiment, the maximum number of bindings is indicated to the nearest power of two, and the exponent may be used as a code. Based on the maximum number of bindings, binding logic 502 selects the one of processes 700 and 1000 that is more efficient (given the structure of lookup table 506) and thereafter uses the selected process to manage lookup table 506.

Figure 13:
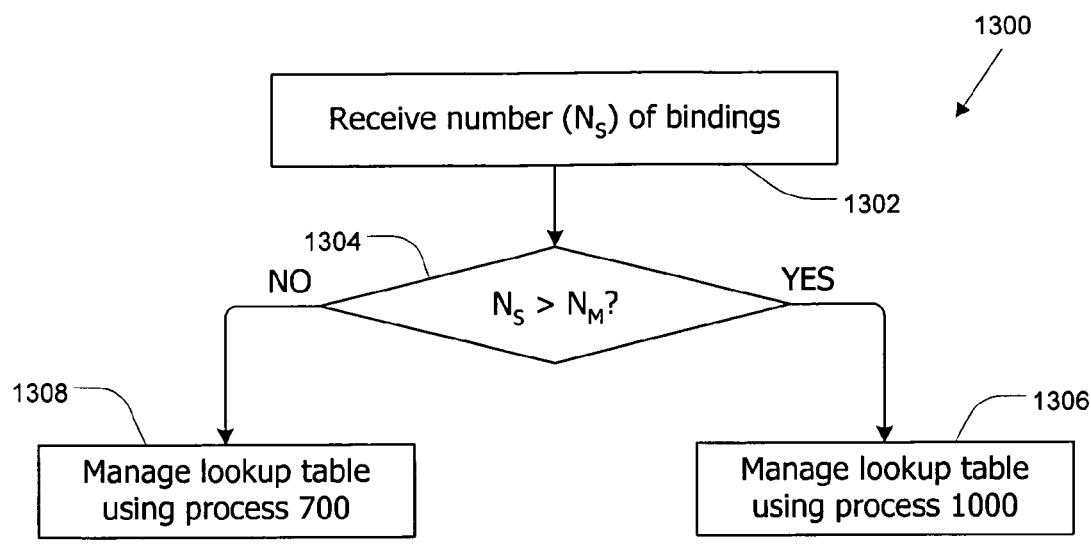
FIG. 13 is a flow diagram of a process for selecting a management scheme for the lookup table of FIG. 6 according to an embodiment of the present invention.

FIG. 13 is a flow diagram of a process 1300 for selecting a management scheme according to an embodiment of the present invention. Process 1300 may be implemented, e.g., in binding logic 502 of FIG. 5.

At step 1302, binding logic 502 receives a number $N_S$ representing the number of bindings to be stored per version. In one embodiment, the number $N_S$ is specified by an application program, e.g., during an initialization phase. The application program communicates the number $N_S$ to the driver, which communicates the number $N_S$ to binding logic 502. In some embodiments, binding logic 502 may receive a code corresponding to $N_S$; for instance, the driver may round $N_S$ up to the next power of 2 (i.e., $2^n$) and represent the rounded value by its exponent n.

At step 1304, it is determined whether the received value $N_S$ exceeds the number $N_M$ of RAMs 602 in lookup table 506. If so, then process 1000 is selected at step 1306; otherwise, process 700 is selected at step 1308. Thereafter, binding logic 502 uses the selected process to manage lookup table 506 as described above.

In this embodiment, process 700 is selected whenever it is possible to avoid storing more than one binding per version in the same RAM. In this circumstance, copying of the bindings could be performed in parallel using either process; process 700, which does not incur additional overhead associated with virtual flags, is selected. Process 1000 is selected where at least one RAM must store two bindings, in which case process 700 would not support copying of all bindings in parallel.

It will be appreciated that selection process 1300 is illustrative and that variations and modifications are possible. Steps described as sequential may be executed in parallel, order of steps may be varied, and steps may be modified or combined. In some embodiments, the driver program selects a management scheme, e.g., in accordance with process 1300, and sends an appropriate instruction to binding logic 502. The special case where the number $N_M$ of RAMs is equal to the number $N_S$ of bindings may be handled by either process 700 or process 1000.

In some embodiments, the number $N_S$ of bindings may change from time to time during system operation. For instance, different applications may choose different values for $N_S$, or an application may change its settings during the course of its execution. When a change in $N_S$ occurs, the driver program advantageously notifies binding logic 502. In response, binding logic 502 may drain the core of any threads that use existing bindings, then start defining new sets of bindings based on the new $N_S$ value, changing the management scheme as appropriate.

FURTHER EMBODIMENTS

While the invention has been described with respect to specific embodiments, one skilled in the art will recognize that numerous modifications are possible. For instance, the particular sizes and numbers of RAMs shown in examples herein are illustrative and may be modified without departing from the scope of the present invention.

The term "lookup table" as used herein refers generally to any data-storage circuit (or set of storage circuits) that can be accessed using an index to retrieve information stored therein. In the case of state information, the lookup table is advantageously indexed by the item of information and a version identifier. A single lookup table can be used to manage state information for one or more processing cores executing any number of threads. Alternatively, multiple separate lookup tables can be provided, with each lookup table being used for a different subset of the processing cores.

The present invention may be used to manage multiple versions of any type of state information in a multithreaded processor, including but not limited to texture binding information as described above. The ability to dynamically select a management scheme for a state information lookup table may be particularly useful in instances where the number of items of state information to be stored per version is variable.

Further, various aspects of the invention may be implemented or not independently of each other. For instance, either of the lookup table management schemes described above might be used independently of the other to manage multiple versions of state information. Where the version management logic, such as the binding logic described above, can select among management schemes, the selection need not be limited to the particular schemes described herein.

Thus, although the invention has been described with respect to specific embodiments, it will be appreciated that the invention is intended to cover all modifications and equivalents within the scope of the following claims.

What is claimed is:

1. A method for managing state information in a processor, the method comprising:
providing a lookup table including a number of memory circuits ("$N_M$"), each memory circuit having a plurality of entries, wherein entries in different ones of the memory circuits are accessible in parallel;
storing a number of items of state information ("$N_S$") belonging to a first state version in a first group of entries selected from the entries in the $N_M$ memory circuits;
receiving an updated value for a first one of the $N_S$ items of state information while the first state version is in use by at least one thread executing in the processor, the first one of the $N_S$ items being stored in an entry in a first one of the $N_M$ memory circuits;
creating a virtual copy of each of the $N_S$ items of state information in a second group of entries selected from the entries in the $N_M$ memory circuits, thereby transferring the first state version to the second group of entries;
replacing the virtual copy of the first one of the $N_S$ items of state information in the second group of entries with a real copy of the first one of the $N_S$ items from the first group of entries; and
replacing the first one of the $N_S$ items in the first group of entries with the updated value, thereby storing a second state version in the first group of entries.

2. The method of claim 1 wherein the first group of entries is selected such that the $N_S$ items belonging to the first state version are stored using a number of the $N_M$ memory circuits that is less than or equal to $N_M/2$.

3. The method of claim 1 wherein the first group of entries is selected such that a minimum number of the $N_M$ memory circuits are used to store the $N_S$ items belonging to the first state version.

4. The method of claim 1 further comprising:
determining, based at least in part on the number $N_S$ of items of state information belonging to the first state version, a maximum number $N_V$ of state versions to be stored in the lookup table.

5. The method of claim 1 further comprising:
prior to receiving the updated value for the first one of the $N_S$ items of state information:
receiving a signal indicating that a first thread is being launched; and storing, in a version map table, an association between the first thread and the first state version, wherein the association identifies the first group of entries; and subsequently to receiving the updated value:

modifying the association in the version map table between the first thread and the first state version to identify the second group of entries.

6. The method of claim 5 further comprising:

receiving a request for one of the $N_S$ items of state information from the first thread;

accessing the version map table to determine which group of entries is to be used to respond to the request; and accessing the group of entries determined from the version map to retrieve the requested item of state information.

7. The method of claim 1 further comprising:

receiving an updated value for a second one of the $N_S$ items of state information while the second state version is not in use;

replacing the virtual copy of the second one of the $N_S$ items of state information in the second group of entries with a real copy of the second one of the $N_S$ items from the first group of entries; and replacing the second one of the $N_S$ items in the first group of entries with the updated value.

8. A device for managing state information in a processor, the device comprising:

a lookup table including a number of memory circuits ("$N_M$"), each memory circuit having a plurality of entries, wherein entries in different ones of the memory circuits are accessible in parallel, the lookup table being configured to store a number of items of state information ("$N_S$") belonging to a first state version in a first group of entries selected from the entries in the $N_M$ memory circuits; and lookup table updating logic coupled to the lookup table and configured to create a new state version by creating a virtual copy of each of the $N_S$ items of state information in a second group of entries selected from the entries in the $N_M$ memory circuits, thereby transferring the first state version to the second group of entries, replacing the virtual copy of the first one of the $N_S$ items in the second group with a real copy of the first one of the $N_S$ items from the first group, and replacing the first one of the $N_S$ items in the first group with the updated value.

9. The device of claim 8 wherein the first group of entries is selected such that the $N_S$ items belonging to the first state version are stored using a number of the $N_M$ memory circuits that is less than or equal to $N_M/2$.

10. The device of claim 9 wherein the first group of entries is selected such that a minimum number of the $N_M$ memory circuits are used to store the $N_S$ items belonging to the first state version.

11. The device of claim 8 further comprising:

lookup table management logic configured to determine, based at least in part on the number $N_S$ of items of state information belonging to the first state version, a maximum number $N_V$ of state versions to be stored in the lookup table.

12. The device of claim 11 further comprising:

a version map table configured to store an association between each of a plurality of concurrently executing threads in the processor and one of the state versions stored in the lookup table.

13. The device of claim 12 further comprising:

lookup table access logic configured to receive a request for an item of state information from one of the concurrently executing threads and to access the version map table to identify which one of the state versions stored in the lookup table is to be used to satisfy the request.

14. The device of claim 12 wherein the lookup table updating logic is further configured to update the version map, after the virtual copy of each of the $N_S$ items is created in the second group of entries, such that any associations in the version map table that refer to the state version stored in the first group of entries are modified to refer to the second group of entries.

15. A processor comprising:

a processing core configured to execute a plurality of threads concurrently; and a core interface coupled to the processing core and configured to provide state information to the processing core in response to a request from one of the plurality of threads, wherein the core interface includes:

a lookup table including a number of items of state information ("$N_S$") each memory circuit having a plurality of entries, wherein entries in different ones of the memory circuits are accessible in parallel, the lookup table being configured to store a number of items of state information ("$N_S$") belonging to a first state version in a first group of entries selected from the entries in the $N_M$ memory circuits; and lookup table updating logic coupled to the lookup table and configured to create a new state version by creating a virtual copy of each of the $N_S$ items of state information in a second group of entries selected from the entries in the $N_M$ memory circuits, thereby transferring the first state version to the second group of entries, replacing the virtual copy of the first one of the $N_S$ items in the second group with a real copy of the first one of the $N_S$ items from the first group, and replacing the first one of the $N_S$ items in the first group with the updated value.

16. The processor of claim 15 wherein the first group of entries is selected such that the $N_S$ items belonging to the first state version are stored using a number of the $N_M$ memory circuits that is less than or equal to $N_M/2$.

17. The processor of claim 16 wherein the first group of entries is selected such that a minimum number of the $N_M$ memory circuits are used to store the $N_S$ items belonging to the first state version.

18. The processor of claim 15 further comprising:

a version map table configured to store an association between each of a plurality of concurrently executing threads in the processor and one of the state versions stored in the lookup table.

19. The processor of claim 18 further comprising:

lookup table access logic configured to receive a request for an item of state information from one of the concurrently executing threads and to access the version map table to identify which one of the state versions stored in the lookup table is to be used to satisfy the request.

20. The processor of claim 18 wherein the lookup table updating logic is further configured to update the version map, after the virtual copy of each of the $N_S$ items is created in the second group of entries, such that any associations in the version map table that refer to the state version stored in the first group of entries are modified to refer to the second group of entries.

* * * * *